Sept. 15, 1959 W. T. SELSTED ET AL 2,904,275

MAGNETIC TAPE MACHINE

Filed July 10, 1957 2 Sheets-Sheet 1

INVENTORS
Walter T. Selsted
BY Robert M. Brumbaugh
Flehr and Swain
ATTORNEYS

Sept. 15, 1959 W. T. SELSTED ET AL 2,904,275

MAGNETIC TAPE MACHINE

Filed July 10, 1957 2 Sheets-Sheet 2

INVENTORS
Walter T. Selsted
Robert M. Brumbaugh
BY
ATTORNEYS

United States Patent Office 2,904,275
Patented Sept. 15, 1959

2,904,275

MAGNETIC TAPE MACHINE

Walter T. Selsted, Redwood City, and Robert M. Brumbaugh, Menlo Park, Calif., assignors to Ampex Corporation, Redwood City, Calif., a corporation of California Application July 10, 1957, Serial No. 671,104

4 Claims. (Cl. 242—55.12)

This invention relates generally to magnetic tape machines used for record and/or playback operations.

In many types of services where magnetic tape machines are applicable, such as collators or computers, it is desirable to drive the tape intermittently with rapid acceleration and deceleration for starting and stopping. However tape driving means capable of rapid starting and stopping operations present a problem with respect to the means employed for supplying the tape to the driving means, and for winding or taking up the tape. Particularly it is difficult to effect rapid start and stop operations without excessive tape tension or slack. Also the tape should be handled in such a manner that the capstan driving means and its associated magnetic head are isolated from the turntables which carry the supply and takeup reels. Prior machines which have been constructed for such services have not been entirely satisfactory, and in particular they have not permitted the desired degree of rapid start and stop operations, without some undesirable performance characteristics, such as undue tape tension or slack, or distortion of the recorded or reproduced signal.

In general it is an object of the present invention to provide apparatus of the above character capable of relatively rapid start and stop operations of the capstan driving means, without undue tape tension or slack, or other undesirable characteristics.

Another object of the invention is to provide apparatus of the above character which will maintain relatively constant tape tension for all operating conditions.

Another object of the invention is to provide novel servo mechanisms adapted to operate upon the portions of the tape extending from the driving means to the supply and takeup reels.

Additional objects of the invention will appear from the following description in which the preferred embodiment has been set forth in detail in conjunction with the accompanying drawing.

Referring to the drawing.

Figure 1:
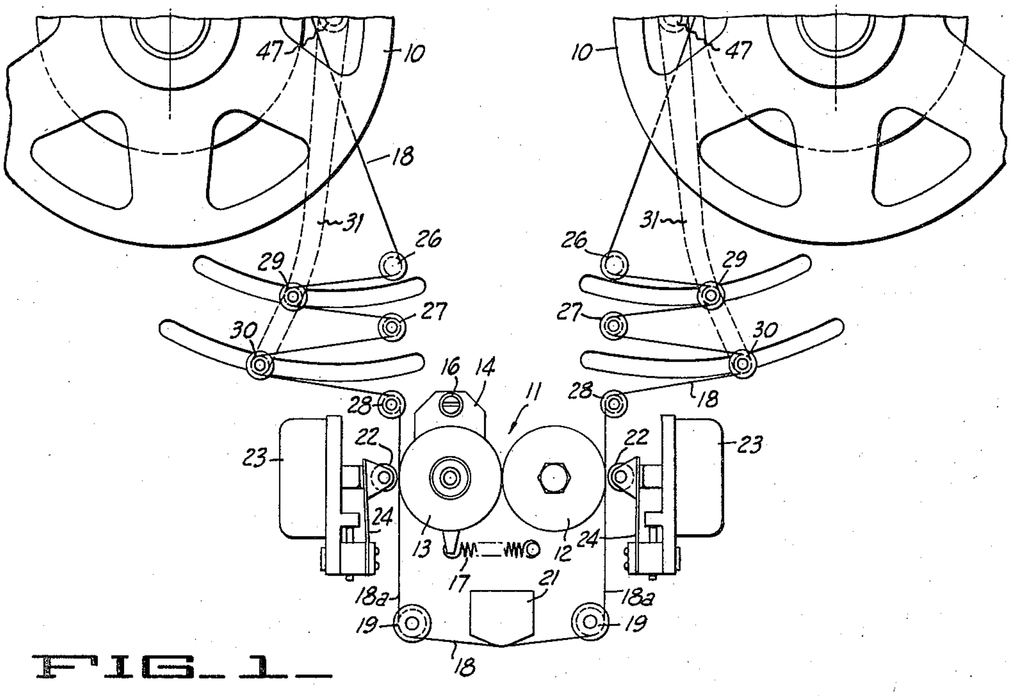
Figure 1 is a schematic plan view illustrating magnetic tape apparatus incorporating the present invention.

The machine illustrated in Figure 1 consists of tape reels 10 upon which the magnetic tape is wound. As is customary practice these reels are carried by suitable rotatable turntables. The motors for applying torque to the turntables are of a particular type as will be presently described. Suitable capstan driving means 11 engages a part of the tape extending between the two reels. In general this driving means is of a type capable of rapid start and stop operations, and may be similar to driving means used in connection with tape transports for computers.

As illustrated the driving means consists of a driving capstan 12 that is connected to a suitable motor (not shown), and an associated capstan 13. The capstan 13 is journalled upon a mounting arm 14, that is pivotally secured at 16 to the mounting panel of the machine, and which is urged by the tension spring 17 whereby the periphery of the capstan 13 is urged into friction driving relation with the periphery of the capstan 12.

The magnetic tape 18 is looped over the flanged guide studs or rollers 19, and is adapted to engage the magnetic head 21. The two portions 18*a* of the tape extend in close proximity with the peripheries of the capstans 12 and 13, and are adapted to be pressed against these capstans by the rollers 22. Suitable means such as solenoids 23 are provided whereby when energized the associated roller presses the tape into driving relation with the associated capstan. As illustrated each roller 22 can be carried by the free end of a spring arm or reed 24, whereby it is normally retracted from contact with the tape, and whereby when the solenoid is energized it is urged against the tape whereby the tape is driven by the associated capstan.

Assuming that the capstans 12 and 13 are driven continuously at a constant speed, it will be evident that the tape can be rapidly started and stopped by energizing one or the other of the solenoids 23. When the righthand solenoid 23 is energized the tape is driven by capstan 12 whereby the tape is supplied from the lefthand reel 10, and taken up by the righthand reel 10. When the lefthand solenoid 23 is energized, the tape is pressed into driving relation with the capstan 13, and is driven in an opposite direction.

Two servo means are provided for operating upon the portions of the tape extending from the reels to the tape driving means. Each means consists of stationary flanged guide studs or rollers 26, 27 and 28, together with movable flanged studs or rollers 29 and 30. The tape is looped zig-zag fashion over these studs as illustrated in Figure 1. The studs 29 and 30 are carried by a takeup arm 31 which is urged in such a manner as to yieldably hold the looped tape under predetermined tension.

Figures 2, 3:
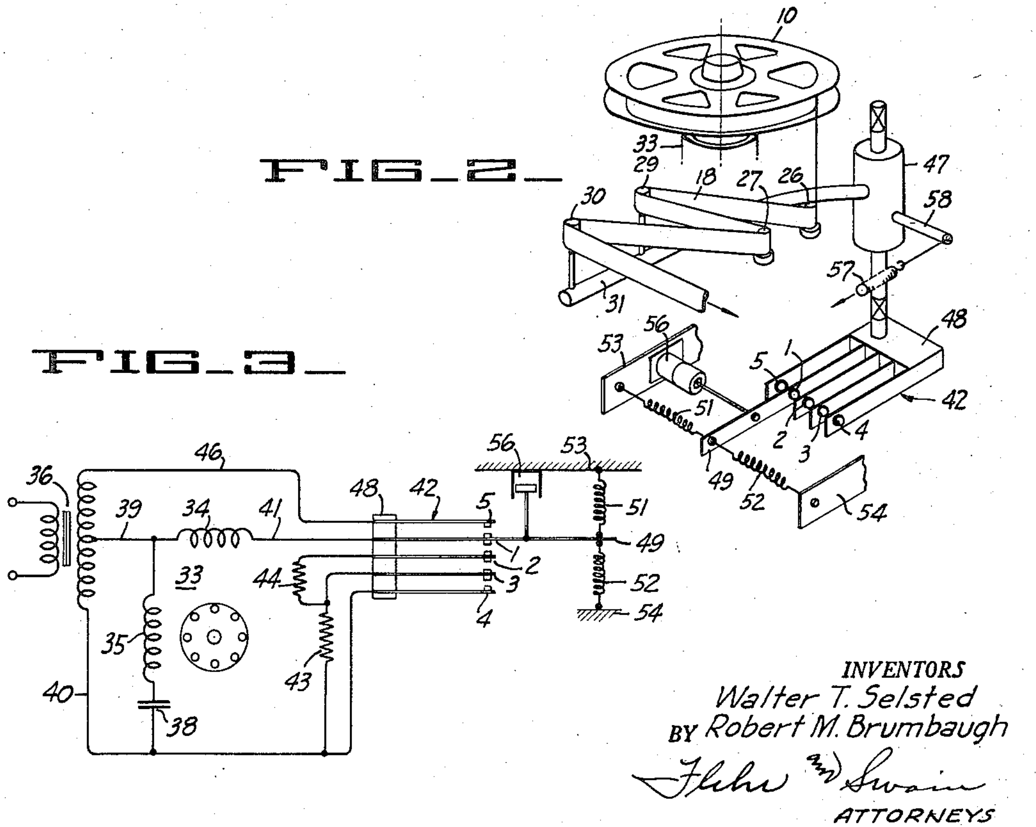
Figure 2 is a schematic view in perspective illustrating the means engaging that part of the tape extending from the supply reel to the tape driving means.
Figure 3 is a circuit diagram illustrating the manner in which one of the turntable torque motors is electrically connected and controlled by contacts.

Each of the turntable motors, indicated generally at 33 in the circuit diagram of Figure 3, is of the reversible type, provided with windings 34 and 35 adapted to be energized to control the amount and direction of torque developed. The motor and circuitry shown in Figure 3 is of the alternating current type. Thus in this instance the circuitry for each motor consists of an alternating current transformer 36 having its primary connected to a source of alternating current, such as the usual 60 cycle 110 volt current supply. The tapped secondary of this transformer provides 180° out of phase voltages. The winding 35 of the motor, which can be referred to as the lead winding, is connected in series with condenser 38 between the transformer leads 39 and 40. Thus the winding 35 is continuously energized, although of itself it does not develop motor torque. A winding 34 is connected in series with the leads 39 and 41 and its excitation is controlled by the multicontact switch 42. Contact 1 of this switch connects to lead 41, contact 4 to lead 40, contact 3 to lead 40 in series with resistor 43, and contact 2 to lead 40 in series with both resistors 44 and 43. Assuming that all the contacts are mounted on leaf springs, deflection of contact 1 in one direction first makes connection with contact 2, thus connecting the winding 34 across the leads 39 and 40, in series with both resistors 44 and 43. Further deflection causes all three contacts 1, 2 and 3 to close, thus shunting out resistor 44, and leaving the winding 34 connected across leads 39 and 40 in series with resistor 43. Further deflection of contact 1 closes four contacts 1, 2, 3 and 4, thus directly connecting winding 34 across the leads 39 and 40. Deflection of contact 1 in the opposite direction causes it to make connection with contact 5, and this connects the winding 34 across the transformer leads 39 and 46.

As shown in Figure 2 the switch 42 is associated with the takeup arm 31 whereby the contact 1 is deflected in one direction or the other in response to movements of the arm. Thus the arm 31 is carried by a shaft 47 which is journalled to turn on an axis parallel to the axis of the associated reel 10. The mounting base 48 of the switch 42 is shown secured to shaft 47, and the switch contact 1 carries a finger 49, which is attached to the so-called centering springs 51 and 52. These springs have their remote ends anchored to fixed points 53 and 54. In order to provide servo stability and to eliminate contact bounce or hunting it is desirable to connect damping or dashpot means to the contact 1. Thus in Figure 2 a simple dashpot 56 is shown with its movable element mechanically connected to the finger 49. The force exerted by the dashpot 56 to the finger 49 and contact 1 is proportional to the velocity of arm 31 in motion. For relatively rapid displacements of arm 31 the dashpot exerts force on contact 1 tending to cause it to close with contacts 2 or 5. For slow displacements the force exerted by the dashpot is negligible and does not affect the direction of closure of contact 1 with the cooperating contacts.

Each of the takeup arms 31 is urged toward tape tensioning position by yieldable means, such as a tension spring 57. One end of each spring is anchored to a fixed point, and the other is attached to an arm 58 secured to the corresponding shaft 47.

Operation of the apparatus described above is as follows: Assuming first that the tape is in static condition, or in other words it is not being driven in one direction or the other by the capstan driving means, all portions of the tape extending between the reels 10 are maintained under tension by virtue of the tension springs 57, which urge the takeup arms 31 outwardly. Likewise for this static condition contact 1 of each switch 42 is closed with respect to contact 2 (or contacts 2 and 3 depending on the reel load), whereby winding 34 of each motor is energized in conjunction with the corresponding winding 35 to provide sufficient torque to maintain tape tension against the springs 57. Now assuming that the tape is rapidly started toward the right by energizing the righthand solenoid 23, both of the takeup arms 31 are shifted from their static positions. The looped portions of the tape for the righthand arm lengthen, and the loops associated with the lefthand arm decrease in length. The switch 42 associated with the righthand takeup arm 31 is conditioned whereby all of the contacts 1, 2, 3 and 4 are momentarily closed, thus causing the winding 34 of the motor 33 associated with the righthand reel to rapidly accelerate in a direction to wind up the tape. Note that under such conditions the increased excitation of winding 34 from the lower side of the transformer secondary serves to increase the motor torque. Before the loops have extended to their maximum length as determined by the limiting position of arm 31, the rate with which the tape is wound is increased to a point sufficient to shorten the tape loops, thus bringing the arm 31 back to a location near a normal operating position. By that time the tape has been accelerated by the capstan means to its maximum normal operating speed, and thereafter the arm 31 remains in a position near centering position, and with closing of contacts 1 and 2, or contacts 1, 2 and 3, whereby the torque serving to rotate the takeup reel is adequate to wind up the tape without slack, irrespective of the diameter of the tape roll.

As previously mentioned during rapid starting of the tape by the capstan driving means, the tape loops upon the left hand side of the machine are shortened, with the result that for this servo means the contacts 1 and 2 are opened and contacts 1 and 5 are momentarily closed to energize winding 34 from the upper side of the transformer secondary, with the result that the torque is reversed to rotate the associated reel in a direction to unwind the tape. The reel is rapidly accelerated to a speed somewhat greater than that required for supplying the tape to the capstan driving means, during normal operation, with the result that the loops of the tape are immediately lengthened with return of the arm 31 to a location at or near normal operating position. During subsequent normal operation the contact 1 is closed with respect to contact 2, or contacts 2 and 3, to maintain proper back tension irrespective of changes in the diameter of the unwinding tape roll.

It will be evident that the operation described above is reversed when the tape is driven in the reverse direction by energizing the lefthand solenoid 23. Irrespective of the direction of drive the servo means associated with the turntables maintains a tape tension relatively constant, and avoids conditions of undue tape slack or tension. As a result the capstan driving means is isolated with respect to the reels and the tape takeup means, thus avoiding distortion during recording or playback operations.

Figure 4:
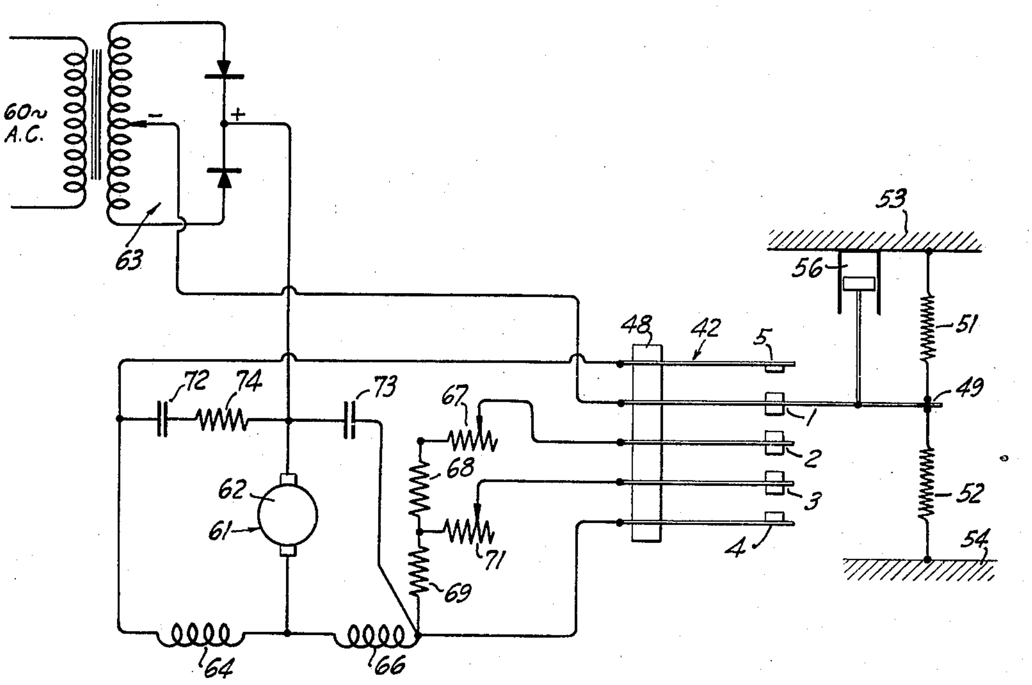
Figure 4 is a circuit diagram showing another embodiment making use of direct current.

Figure 4 shows a circuit and motor of the direct current type. In this instance the motor 61 is of the D.C. series field type. One terminal of the armature 62 connects to the D.C. rectifier, or other suitable current source. One field winding 64 connects in series between the armature and contact 5. The other field winding 66 connects in series between the armature and contact 4. Contact 1 connects to the other terminal of the rectifier 63. Contact 2 connects with winding 66 through the series resistors 67, 68, and 69. Contact 3 connects with winding 66 in series with resistors 71 and 69. Condensers 72 and 73, together with resistor 74, are provided to minimize contact arcing. In general the arrangement of Figure 4 operates in the same manner as Figure 3. Energization of the windings 64 and 66 is controlled by the positioning of switch 42, thereby controlling the direction of motor torque, and the amount of torque, to obtain the same results as described for Figure 3.

This application is a continuation-in-part of our copending application Serial No. 557,800, filed January 6, 1956 (now abandoned), and entitled "Magnetic Tape Machine."

We claim:

1. In a magnetic tape apparatus, a tape storage reel, capstan means for driving the tape in either direction with rapid start and stop operations, stationary and movable tape engaging elements over which a portion of the tape extending from the reel to the capstan means is looped, a movable arm serving to carry a movable element, spring means for yieldably urging the arm in a direction tending to increase the length of the tape loop, an electrical switch having a main and side contacts, a mechanical connection between the arm and the switch for causing relative movement between the main and side contacts as the arm is caused to move toward the limits of its travel from a general intermediate position, a reversible electrical motor connected to drive the tape reel, said motor having two windings capable of being energized to cause motor torque to be developed in one direction or the other, and an electrical energizing circuit including said windings and the contacts of said switch, said circuit serving to energize said windings to develop motor torque in one direction or the other responsive to switch contact movement to close the main contact against one side contact or the other, the motor serving to turn the reel to wind up the tape responsive to movement of the arm in accordance with an increase in the length of the tape loop beyond an intermediate length and to reversely turn the reel to supply tape at a rapid rate responsive to movement of the arm in accordance with a decrease in the length of the tape loop from said intermediate length.

2. Apparatus as in claim 1 in which one of said motor windings is connected to the circuit for continuous energization of the same, such continuous energization serving to develop torque in a direction to wind up the tapes.

3. Apparatus as in claim 1 together with mechanical damping means connected to the switch contacts.

4. Apparatus as in claim 3 in which the damping means includes a pneumatic dash pot having stationary and movable parts, and yieldable means for urging the movable part toward a position intermediate its limits of travel, said movable part being connected to the main contact of the switch.

References Cited in the file of this patent

UNITED STATES PATENTS

| | | |
|---|---|---|
| 2,202,419 | Geuder | May 28, 1940 |
| 2,656,129 | De Turk et al. | Oct. 20, 1953 |
| 2,730,309 | Baer | Jan. 10, 1956 |
| 2,814,676 | House | Nov. 26, 1957 |